(12) United States Patent
Davis et al.

(10) Patent No.: US 7,899,665 B2
(45) Date of Patent: Mar. 1, 2011

(54) METHODS AND SYSTEMS FOR DETECTING THE ALPHABETIC ORDER USED BY DIFFERENT LANGUAGES

(75) Inventors: Mark Edward Davis, Menlo Park, CA (US); Vladimir Weinstein, Burlingame, CA (US)

(73) Assignee: International Business Machines Corporation, Armonk, NY (US)

( * ) Notice: Subject to any disclaimer, the term of this patent is extended or adjusted under 35 U.S.C. 154(b) by 1225 days.

(21) Appl. No.: 10/922,100

(22) Filed: Aug. 20, 2004

(65) Prior Publication Data

US 2006/0041422 A1   Feb. 23, 2006

(51) Int. Cl.
G06F 17/20 (2006.01)
G06F 7/00 (2006.01)
G06F 17/30 (2006.01)

(52) U.S. Cl. ............................................ 704/8; 707/752
(58) Field of Classification Search ........................ None
See application file for complete search history.

(56) References Cited

U.S. PATENT DOCUMENTS

| | | | |
|---|---|---|---|
| 4,843,389 A | | 6/1989 | Lisle et al. |
| 4,939,639 A | * | 7/1990 | Lee et al. ........................ 707/7 |
| 5,060,146 A | * | 10/1991 | Chang et al. ................... 707/7 |
| 5,675,818 A | | 10/1997 | Kennedy |
| 5,778,213 A | * | 7/1998 | Shakib et al. .................. 703/27 |
| 5,787,426 A | * | 7/1998 | Koshiba et al. ................ 707/7 |
| 5,799,303 A | * | 8/1998 | Tsuchimura .................... 707/7 |
| 5,873,111 A | | 2/1999 | Edberg |
| 6,138,086 A | * | 10/2000 | Rose et al. ...................... 704/8 |
| 6,295,524 B1 | * | 9/2001 | Yianilos et al. ................ 706/12 |
| 6,389,386 B1 | * | 5/2002 | Hetherington et al. ......... 704/8 |
| 6,400,287 B1 | | 6/2002 | Ehrman |
| 6,438,516 B1 | | 8/2002 | Davis |
| 6,643,647 B2 | | 11/2003 | Natori |
| 6,928,438 B2 | * | 8/2005 | Daray et al. .................... 707/7 |
| 7,130,470 B1 | * | 10/2006 | Ho .............................. 382/229 |
| 2002/0052902 A1 | | 5/2002 | Bauer |
| 2002/0102545 A1 | | 8/2002 | Shibuya |
| 2003/0233340 A1 | | 12/2003 | Flasza et al. |
| 2003/0235276 A1 | * | 12/2003 | Tateishi et al. ........... 379/88.01 |
| 2004/0006569 A1 | | 1/2004 | Carlin et al. |
| 2004/0044676 A1 | | 3/2004 | Natori |
| 2004/0044791 A1 | | 3/2004 | Pouzzner |

OTHER PUBLICATIONS

Mark Davis et al., "Unicode Collation Algorithm," Jan. 8, 2004, http://www.unicode.org/reports/tr10/.

* cited by examiner

*Primary Examiner*—Talivaldis I Smits
*Assistant Examiner*—Jesse S Pullias
(74) *Attorney, Agent, or Firm*—Sughrue Mion, PLLC (57) ABSTRACT

Embodiments of the present invention can gather data from native language sources to produce a valid collation sequence that is appropriate for a particular language and application. Sequences of characters in this data are tested to determine strength levels used by the given language. The data is also recursively probed with other sequences to test for contractions and identify expansions. Sequences in the data may then be compared against a known or predetermined sequence to generate a set of sorting rules that is specific to the language and application. The rules are formatted to replicate the sorting order found in the data.

31 Claims, 6 Drawing Sheets

| | 302 | 304 | 306 | COLLATION ELEMENT TABLE 300 |
|---|---|---|---|---|
| | Character Code | Collation Element | Character Name | |
| | 0020 " " | [*0209.0020.0002] | SPACE | |
| | | | | |
| | | | | |
| | | | | |
| | | | | |
| | | | | |
| | | | | |

METHODS AND SYSTEMS FOR DETECTING THE ALPHABETIC ORDER USED BY DIFFERENT LANGUAGES

FIELD

The present invention relates to sorting character strings, and more particularly, it relates to language-dependent sorting of character strings

BACKGROUND

Computer systems and processors handle character strings, such as letters, numbers, symbols, and the like, based on sets of standardized character codes. A prevalent function of handling character strings is sorting, also known as collation. Collation is one of the fundamental operations on computers, and is used in practically every application.

Generally, it is straightforward to determine the simple ordering of characters based on a primary "strength" difference. For example, "a" has a primary strength difference from "b". However, characters can also differ from each other in more subtle ways at lower levels of strength, such as case, contractions, accent markings, etc. For example, character strings may sort differently based on whether they include upper-case versus lower-case characters (e.g., "A" versus "a"). Character strings may also sort differently based on whether they act as contractions or expansions. For example, in Slovak, "ch" is sorted as it if were contracted to single letter after "c". As another example, in German, "ä" is sorted as it if were expanded to "ae".

Unfortunately, different languages, such as English, Swedish, Hungarian, Japanese, have very different conventions for alphabetically ordering (or collating) strings of text. It can be quite difficult to precisely determine what the alphabetical order should be for a given language due to the multiple levels of strength in which characters may differ. In addition, across different languages, there can be tremendous variety in terms of how sequences of one or more characters are handled. For example, some nations may have standards that specify how to perform alphabetic sorting. However, many do not. Even if a standard exists, it may have multiple options. For example, Deutsches Institut fur Normung ("DIN") standard 5007 for German collation provides multiple options for sorting text. This often leads to a wide variety of implementations for sorting even under the same standard.

Collation may also vary by specific application, even within the same language. Dictionaries may sort differently than phonebooks or book indices. For non-alphabetic scripts such as East Asian ideographs, collation can be either phonetic or based on the appearance of the character. Collation can also be customized or configured according to user preference, such as ignoring punctuation or not, putting uppercase before lowercase (or vice versa), etc. Thus collation implementations must often deal with complex linguistic conventions and provide for common customizations based on market or user preferences.

Despite, these difficulties, it is increasingly important to provide collation tools and methods that can replicate the precise ordering used by different cultures, and different systems. Sorting and collation is a key function in computer systems, for example, whenever a list of strings is presented to users in a sorted order so that they can easily and reliably find individual strings. Collation is also crucial for the operation of databases, not only in sorting records but also in selecting sets of records with fields within given bounds. Therefore, it would be desirable to provide methods and systems that are capable of determining the order appropriate for a given language, location, or application. It may also be desirable to provide methods and systems that can automatically gather and implement the unique rules for collation of a particular language.

SUMMARY

In accordance with some embodiments of the invention, methods and apparatus determine a set of rules for ordering text of a language. Information that indicates a target order of sets of characters in text of a language is received. Strengths of differences between the characters are determined based on the target order. Strings of characters that were sorted in the target order as a shorter string of characters are identified. Strings of characters that were sorted in the target order as if they were longer strings of characters are also identified. A set of rules for ordering text of the language is then determined based on the strengths of differences between the characters, the identified strings of characters that were sorted in the target order as a shorter string, and the identified strings of characters that were sorted in the target order as a longer string.

In accordance with some embodiments of the invention, a system is configured to determine a set of rules for ordering text of a language. The system can include an interface and a processor. The interface is configured to receive information that indicates a target order of sets of characters in text of a language. The processor is configured by program code to determine strengths of differences between the characters based on the target order, identify strings of characters that were sorted in the target order as a shorter string of characters, identify strings of characters that were sorted in the target order as a longer string of characters, determine a set of rules for ordering text of the language based on the strengths of differences between the characters, the identified strings of characters that were sorted in the target order as a shorter string, and the identified strings of characters that were sorted in the target order as a longer string.

Additional features and embodiments of the invention will be set forth in part in the description which follows, and in part will be obvious from the description, or may be learned by practice of the invention. It is to be understood that both the foregoing general description and the following detailed description are exemplary and explanatory only and are not restrictive of the embodiments of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Some embodiments of the present invention gather data from native language sources to produce a valid collation sequence that is appropriate for a particular language and application. The data can take a variety of forms including written sorted data, such as from dictionaries or phone books, information from querying native speakers as to particular cases, or data exchanged with a computer processor or system.

Sequences of characters in this data are tested to determine strength levels used by the given language. The data is also recursively probed with other sequences to test for contractions and identify expansions. Sequences in the data may then be compared against a known or predetermined sequence to generate a set of sorting rules that is specific to the language and application. The rules are formatted to replicate the order of the data from the language source.

For example, in some embodiments, data called a "target ordering" is gathered from a language source. The target order is analyzed to produce a set of rules, such as a set of Unicode collation algorithm ("UCA") tailoring rules that will reproduce the target ordering when applied. These rules can then be formatted based on International Components for Unicode ("ICU") or Locale Data Markup Language ("LDML") syntax for implementation in various systems.

Reference will now be made in detail to the exemplary embodiments of the invention, examples of which are illustrated in the accompanying drawings. Wherever possible, the same reference numbers will be used throughout the drawings to refer to the same or like parts.

Figure 1:
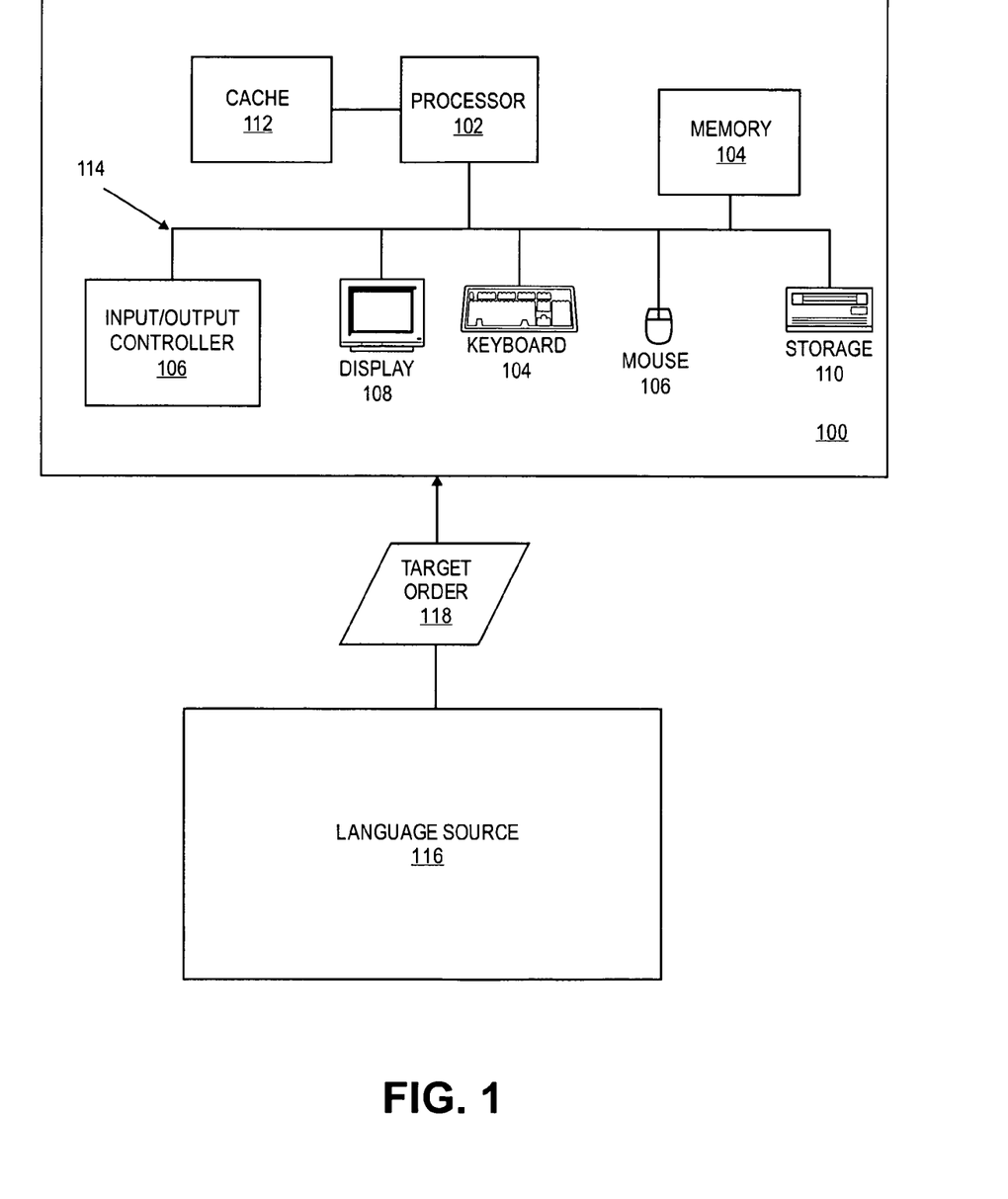
FIG. 1 illustrates a computer system that is consistent with embodiments of the present invention.

FIG. 1 illustrates a computer system 100. Computer system 100 may be programmed with software to perform collation in accordance with the principles of the present invention. Examples of the components that may be included in computer system 100 will now be described.

As shown, a computer system 100 may include a central processor 102, a main memory 104, an input/output controller 106, a keyboard 104, a pointing device 106 (e.g., mouse, or the like), a display 108, and a storage device 110. Processor 102 may further include a cache memory 112 for storing frequently accessed information. Cache 112 may be an "on-chip" cache or external cache. System 100 may also be provided with additional input/output devices, such as a printer (not shown). The various components of the system 100 communicate through a system bus 114 or similar architecture.

Although FIG. 1 illustrates one example of a computer system, the principles of the present invention are applicable to other types of processors and systems. That is, the present invention may be applied to any type of processor or system that performs collation. Examples of such devices include personal computers, servers, handheld devices, and their known equivalents.

In addition, as shown in FIG. 1, computer system 100 may be coupled to language source 116. Language source 116 may be any source providing data that indicates a valid collation sequence, which is considered appropriate for a particular language or application. For example, language source 116 can be a written source, such as a dictionary, book, or phone book. Language source 116 can also be information from a native speaker. Furthermore, language source 116 can be a computer system or processor that is configured according to a particular language or application.

For purposes of illustration, FIG. 1 shows language source 116 providing data, called target order 118, to computer system 100. In some embodiments, the data in target order 118 is sufficient for computer system 100 to compare a set of given strings and determine a resulting sort order for a collation. For example, if language source 116 is a computer system, then computer system 100 may exchange one or more sets of arbitrary strings with language source 116 and interactively obtain resulting sort orders. Target order 118 may also be in the form of other types of data, such as files stored on a medium, data packets transmitted over a network, etc.

Figure 2:
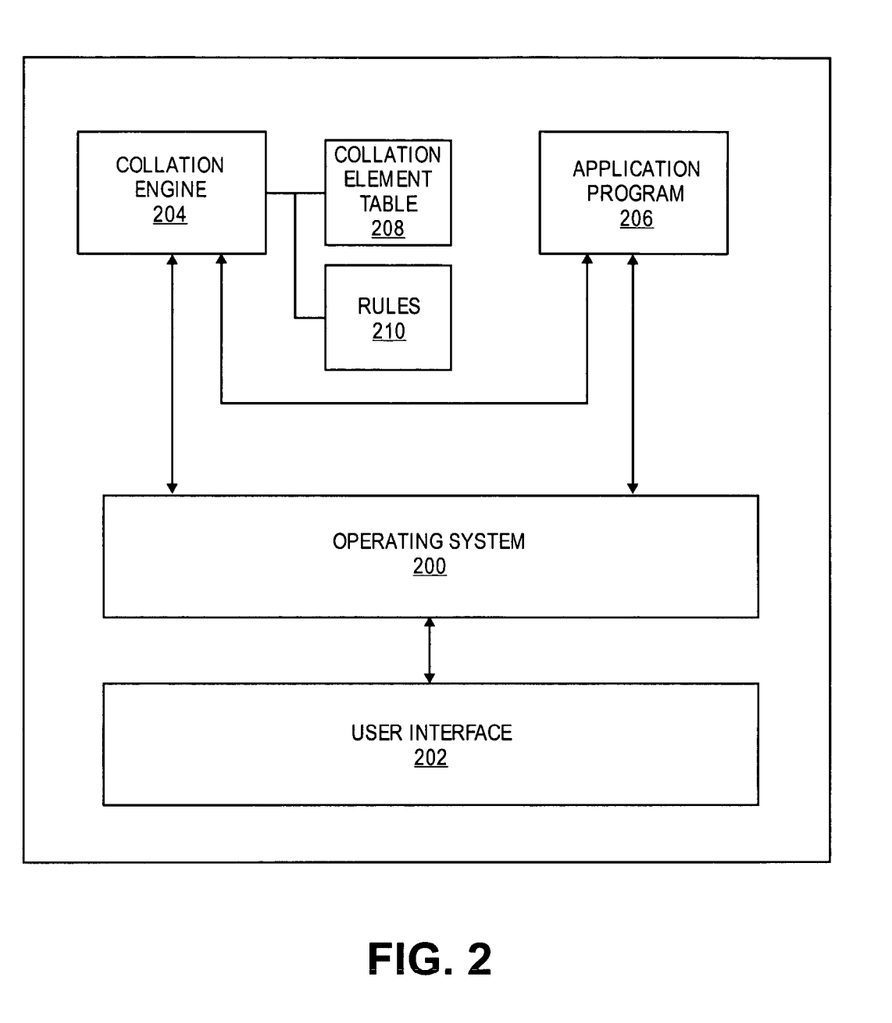
FIG. 2 illustrates an example of a software architecture for system that is consistent with embodiments of the present invention.

FIG. 2 illustrates an example of a software architecture for system 100. As shown, the software architecture of computer system 100 may include an operating system ("OS") 200, a user interface 202, a collation engine 204, and one or more application software programs 206. These components may be implemented as software, firmware, or some combination of both, which is stored in system memory 104 of system 100. The software components may be written in a variety of programming languages, such as C, C++, Java, etc.

OS 200 is an integrated collection of routines that service the sequencing and processing of programs and applications by computer system 100. OS 200 may provide many services for computer system 100, such as resource allocation, scheduling, input/output control, and data management. OS 200 may be predominantly software, but may also comprise partial or complete hardware implementations and firmware. Well known examples of operating systems that are consistent with the principles of the present invention include Mac OS by Apple Computer, Open VMS, GNU/Linux, AIX by IBM, Java and Sun Solaris by Sun Microsystems, and Windows CE and Windows XP by Microsoft Corporation.

Interface 202 provides a user interface for controlling the operation of computer system 100. Interface 202 may comprise an environment or program that displays, or facilitates the display of on-screen options, usually in the form of icons and menus in response to user commands. Options provided by interface 202 may be selected by the user through the operation of hardware, such as mouse 106 and keyboard 104. These interfaces, such as the Windows Operating System, are well known in the art.

Additional application programs, such as application software 206, may be "loaded" (i.e., transferred from storage 110 into cache 112) for execution by the system 100. For example, application software 206 may comprise application, such as a word processor, spreadsheet, or database management system. Well known applications that may be used in accordance with the principles of the present invention include database management programs, such as DB2 by IBM, font and printing software, and other programming languages.

Collation engine 204 performs collation on behalf of system 100. Collation engine 204 may be implemented as a component of OS 200 or application software 206. Alternatively, collation engine 204 may be implemented as a separate module that is coupled to OS 200 or application software 206 via an application program interface. As also shown in FIG. 2, collation engine 204 can interface with application software 206 directly without going through OS 200. In some embodiments, collation engine 204 may be implemented as software written in a known programming language, such as C, C++, or Java. For example, in some embodiments, collation engine 204 may be implemented based on IBM's "International Components for Unicode" ("ICU"). ICU is a set of C/C++ and Java libraries for Unicode support and software internationalization and globalization. Methods used by collation engine 204 will be described with reference to FIG. 5. Of course one skilled in the art will recognize that collation engine 204 based on a variety of products and support any number of encoding standards.

It may now be helpful to illustrate certain data structures employed by the collation engine 204. Collation engine 204 may employ a collation element table 208 and a set of rules 210. In order to flexibly account for the various strengths of differences between characters, collation element table 208 may employ collation elements having multiple weight levels. In addition, collation engine 204 may optionally employ sort keys. These data structures are described with reference to FIGS. 3a, 3b, and 3c.

In addition, collation engine 204 may employ a set of rules 210. For example, in some embodiments, rules 210 may be rules that comply with the UCA and may also include additional rules that tailor the operation of the UCA to a particular language or application. Similar to the collation elements of collation element table 208, rules 210 may specify rules for each of the various strengths of differences between characters.

For example, in some embodiments, rules 210 may include rules for tailoring a Default Unicode Collation Element Table to produce another table in collation element table 208. Rules 210 may specify a variety of actions, such as reordering any character (or contraction) with respect to others in the standard ordering of the Default Unicode Collation Element Table ("DUCET"). Such a reordering in rules 210 can represent a Level 1 strength difference, Level 2 strength difference, Level 3 strength difference, etc. Since such reordering includes sequences, rules 210 can specify any number of arbitrary multiple mappings.

Rules 210 may also specify actions specific to a given language, such as setting the secondary level to be backwards, i.e., as typical for French, setting variable weighting options for a particular language, or customizing the list of variable collation elements to be used for a particular language or application.

For purposes of illustration, some examples of the syntax for rules 210 is provided below in Table 1. In table 1 below, x and y are used to indicate one or more characters, including those characters that expand or contract.

TABLE 1

| Rule | Action |
| --- | --- |
| & y < x | Make x primary-greater than y |
| & y << x | Make x secondary-greater than y |
| & y <<< x | Make x tertiary-greater than y |
| & y = x | Make x equal to y |

Figure 3A:
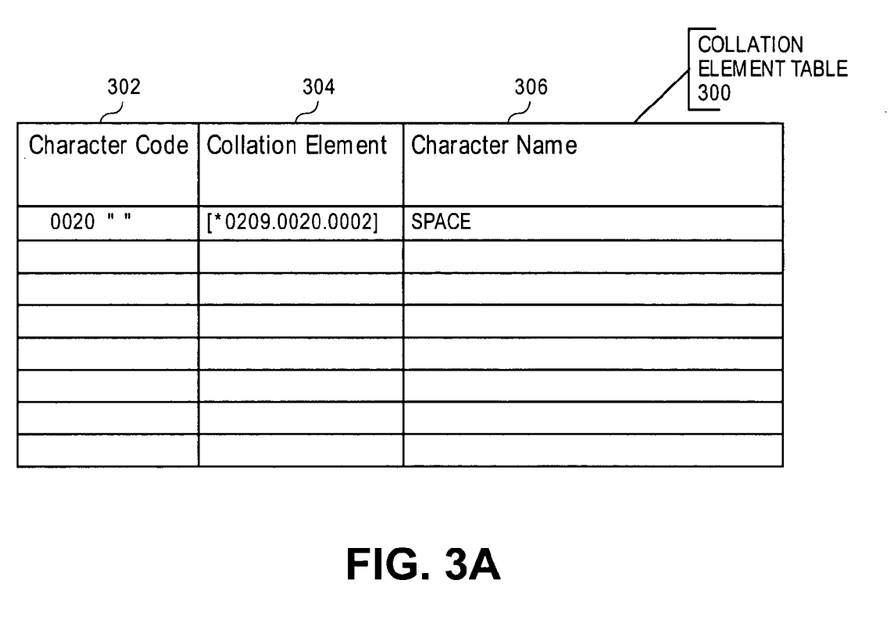
FIG. 3a illustrates a typical collation element table that is consistent with embodiments of the present invention.

Examples of the data structures for collation element table 208 will now be described with reference to FIGS. 3a, 3b, and 3c. FIG. 3a illustrates a collation element table 300 that may be used for collation element table 208. Of course, other types and configurations of collation element tables may be used.

Referring now to FIG. 3a, collation element table 300 contains a mapping from one (or more) characters to one (or more) collation elements. As shown, collation element table 300 may comprise a character code column 302 and a collation element column 304. Collation element table 300 may also optionally include a character name column 306, for example, to assist a user or programmer interpret contents of table 300. However, the contents of character name column 306 are separate from the collation elements. The mapping from characters to collation elements may map one character to one collation element, one collation element to many characters, many collation elements to one character, or from many collation elements to many characters. For example, collation element table 300 is shown with an entry for a "SPACE" character.

There are several well known standards for encoding characters. These standards include, for example, standards by the Unicode Consortium, and ISO. In some embodiments, the Unicode character set may be used. However, one skilled in the art will recognize that any standard for encoding characters may be used in accordance with the principles of the present invention.

In some embodiments, collation engine 204 may perform collation based on the UCA. According to the UCA, an input character string is checked against collation element table 300 to determine its respective collation elements. A sort key, such as the one illustrated in FIG. 4, may then be produced based on the collation elements of the character strings.

Figure 3B:
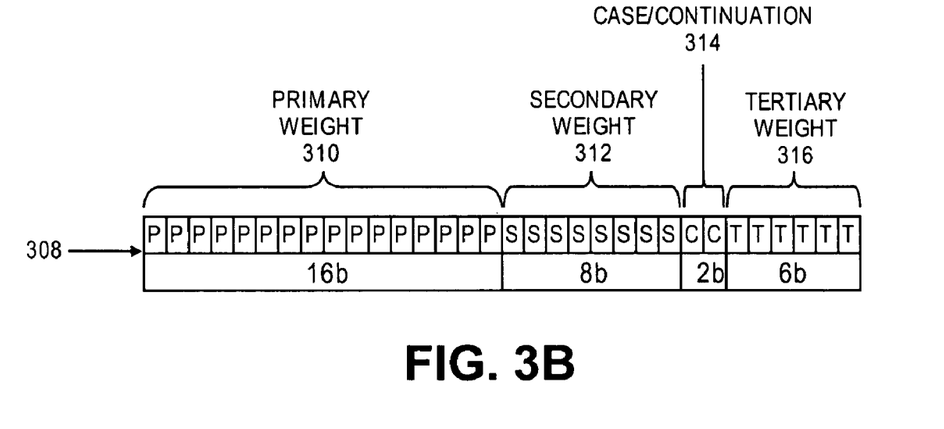
FIG. 3b illustrates a first collation element format that is consistent with embodiments of the present invention.
Figure 3C:
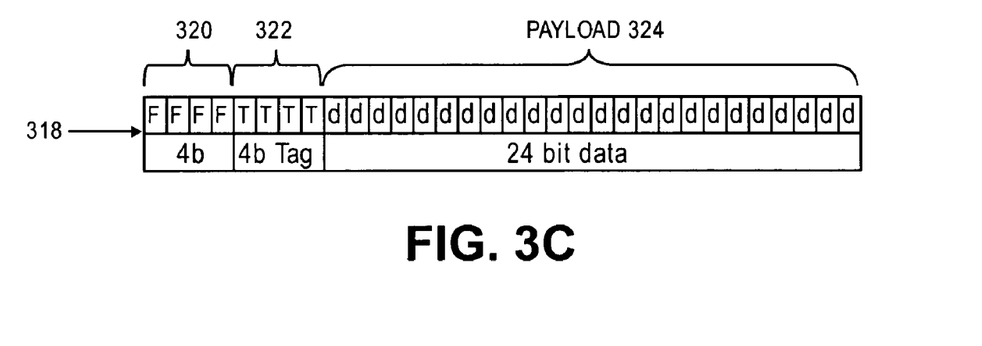
FIG. 3c illustrates a second collation element format that is consistent with embodiments of the present invention.

As explained above, in some embodiments, collation engine 204 may use multilevel Unicode collation elements, such as those illustrated in FIGS. 3b and 3c. In some embodiments, by default, collation engine 204 may use three fully-customizable levels, and thus, collation element table 300 may simply store 32-bit collation elements for each significant character. However, one skilled in the art will recognize that the present invention is not limited to supporting only the UCA or collation elements having three levels. For example, an application which uses the collation engine 204 may choose to have a fully customizable fourth level weight in the collation elements.

The various columns of collation element table 300 will now be described. In some embodiments, collation element table 300 may include the predetermined collation elements set forth in the DUCET of the Unicode Standard. Accordingly, for ease of illustration, collation element table 300 will be explained using the UCA and Unicode standard as an explanatory example. However, one skilled in the art will recognize that collation element table 300 may include any set of predetermined collation elements from a given organization.

Character code column 302 includes the numeric codes that uniquely identify each character of a character string. In some embodiments, character code column 302 may use codes known as code points that are specified in the DUCET. As noted above, any set of character codes may be used in accordance with the principles of the present invention. Table 2 below illustrates some sample code points from the DUCET and their corresponding collation elements and names.

TABLE 2

| Character Code | Collation Element | Character Name |
| --- | --- | --- |
| 0030 "0" | [0A0B.0020.0002] | DIGIT ZERO |
| 2468 "9" | [0A14.0020.0006] | CIRCLED DIGIT 9 |
| 0061 "a" | [06D9.0020.0002] | LATIN SMALL LETTER A |
| 0062 "b" | [06EE.0020.0002] | LATIN SMALL LETTER B |
| 0063 "c" | [0706.0020.0002] | LATIN SMALL LETTER C |
| 0043 "C" | [0706.0020.0008] | LATIN CAPITAL LETTER C |
| 0064 "d" | [0712.0020.0002] | LATIN SMALL LETTER D |

Collation element column 304 includes the collation elements that correspond to each code point for a character. In general, a collation element is an ordered list of one or more numeric codes that indicate weights affecting how a particular character will be sorted during collation. For example, according to the Unicode standard, a collation element may be a 32-bit value that comprises one or more portions corresponding to each weight. Collation elements are also further described with reference to FIGS. 3b and 3c.

Character name column 306 includes information for identifying a particular character. Character name column 306, for example, may include information that identifies a language, the character's case, and a name for the printable natural language version of the character.

FIG. 3b illustrates a first collation element format. As noted above, for ease of illustration, FIG. 3b illustrates a collation element format 308 that is consistent with the Unicode standard. However, the present invention may support any format of collation element.

Referring now to FIG. 3b, first collation element format 308 may comprise a 32 bit value. As shown, the first 16 bits set forth a primary weight value 310. A secondary weight value 312 is then specified in the next 8 bits. A set of case/continuation bits 314 is specified in the following 2 bits, and a tertiary weight value 316 is specified in the last 6 bits. The weight values 310, 312, and 316 in the collation element are used to resolve a character's location in a sorting order and may be broken into multiple levels, i.e., a primary weight, secondary weight, and tertiary weight.

Primary weight value 310 represents a group of similar characters. Primary weight value 310 determines the basic sorting of the character string and takes precedence over the other weight values. For example, the primary weight values for the letters "a" and "b" or numbers "1" and "2" will be different.

Secondary weight value 312 and tertiary weight value 316 relate to other linguistic elements of the character, such as accent markings, that are important to users in ordering, but have less importance to basic sorting. In practice, not all of these levels may be needed or used, depending on the user preferences or customizations.

Case/Continuation value 314 may be used to indicate a case value for a character, or to indicate that collation element 308 continues into another collation element. When indicating a case, case/continuation value 314 can either be used as part of the case level, or considered part of tertiary weight 316. In addition, case/continuation value 314 may be inverted, thus changing whether small case characters are sorted before large case characters or vice versa.

Referring now to FIG. 3c, a second collation element format is illustrated. Again, for purposes of illustration, FIG. 3c illustrates another collation element format that is consistent with the Unicode standard. However, any collation element format is consistent with the principles of the present invention.

As shown, second collation element format 318 may also be a 32 bit value. Second collation element format 318 may be distinguishable from first collation element format 308 in that the header or first set of bits 320 are set to "1" (or "FF" in hexadecimal format). Second collation element format 318 may further include a 4 bit tag value 322 and a payload section 324 of 24 bits for carrying general data for encoding a character. Payload section 324 may be used to encode characters and form collation elements in a format that is distinguishable from first collation element format 308. For example, in some embodiments, second collation element format 318 may be used to form one or more additional sets of collation elements that are different from the default predetermined collation elements specified in the DUCET.

Figure 4:
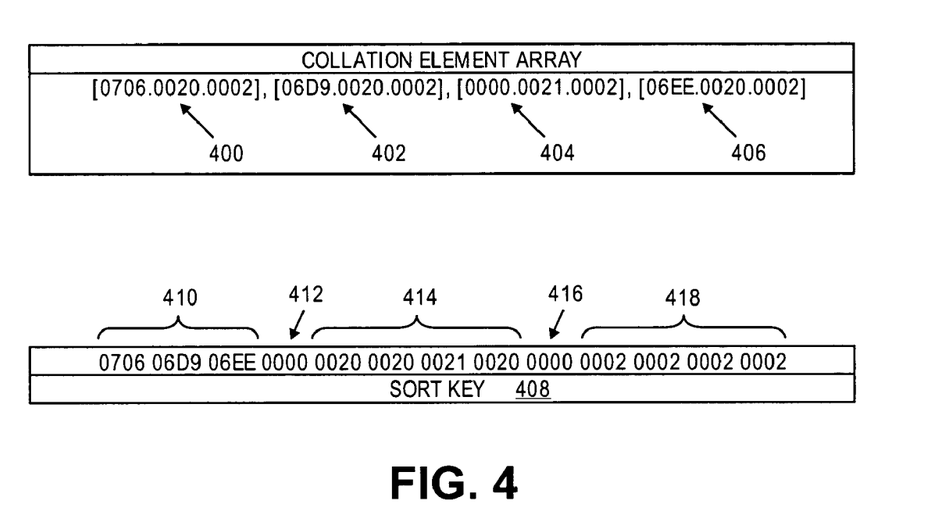
FIG. 4 illustrates a sort key that is consistent with embodiments of the present invention.

FIG. 4 illustrates a sort key that is consistent with the principles of the present invention. For purpose of illustration, FIG. 4 shows an array of collation elements 400, 402, 404, and 406 for an exemplary string of characters. Sort key 408 provides a variable length data structure for assisting in the collation of a character string. As shown, sort key 408 comprises a primary weight section 410, a first level separator 412, a secondary weight section 414, a second level separator 416, and a tertiary weight section 418. In some embodiments, a trailer (not shown) may also follow tertiary weight section 418.

In some embodiments, collation engine 204 forms sort key 408 by successively appending weights from the array of collation element arrays for a character string into respective sections. That is, the primary weights from each collation element are appended into primary weight section; the secondary weights are appended into secondary weight section, and so on. For example, as shown in FIG. 4, collation elements 400, 402, 404, and 406 may include primary weights "0706," "06D9," "0000," and "06EE," respectively. Accordingly, collation engine 204 may form sort key 408 with a primary weight section 410 of "0706 06D9 06EE." Collation engine 204 may then insert level separator 410, such as a "00," and append the secondary weights from collation elements 400, 402, 404, and 406, and so forth. By forming sort key 408 in this manner, in some of the embodiments, collation engine 204 may thus handle any number of continuous sequences of numbers within a string.

Because database operations may be sensitive to collation speed and sort key length, in some embodiments, collation engine 204 may generate smaller length sort keys that are based on the Unicode standard. For example, collation engine 204 may use less than all of the available levels in the collation element array. In particular, collation engine 204 may elect to ignore or not append higher level weights, such as the secondary or tertiary weights, into the sort key, such as sort key 408. Thus, by electing to ignore one or more weights from collation elements, collation engine 204 may generate shorter length sort keys. Furthermore, collation engine 204 may use one or more known compression algorithms to compress sort key 408 into a shorter length. However, any length sort key may be used in accordance with the principles of the present invention. The length of the sort key used by collation engine 204 may be based upon user preference or a configuration setting of system 100. According to the present invention, during collation, two or more sort keys may be binary-compared to give the correct alphabetical sorting between the strings for which they correspond.

Alternatively, collation engine 204 may perform sorting without the use of sort keys. For example, some applications or APIs may be configured to collate or sort character strings based on direct comparison rather than sort keys. Accordingly, in some embodiments, collation engine 204 may encode character strings into bit sequences based on the data structures described above and then directly compare the bit sequences to each other to determine their order, such as an alphabetic order. One skilled in the art will recognize that the principles of the present invention are applicable to either type of collation.

Figure 5:
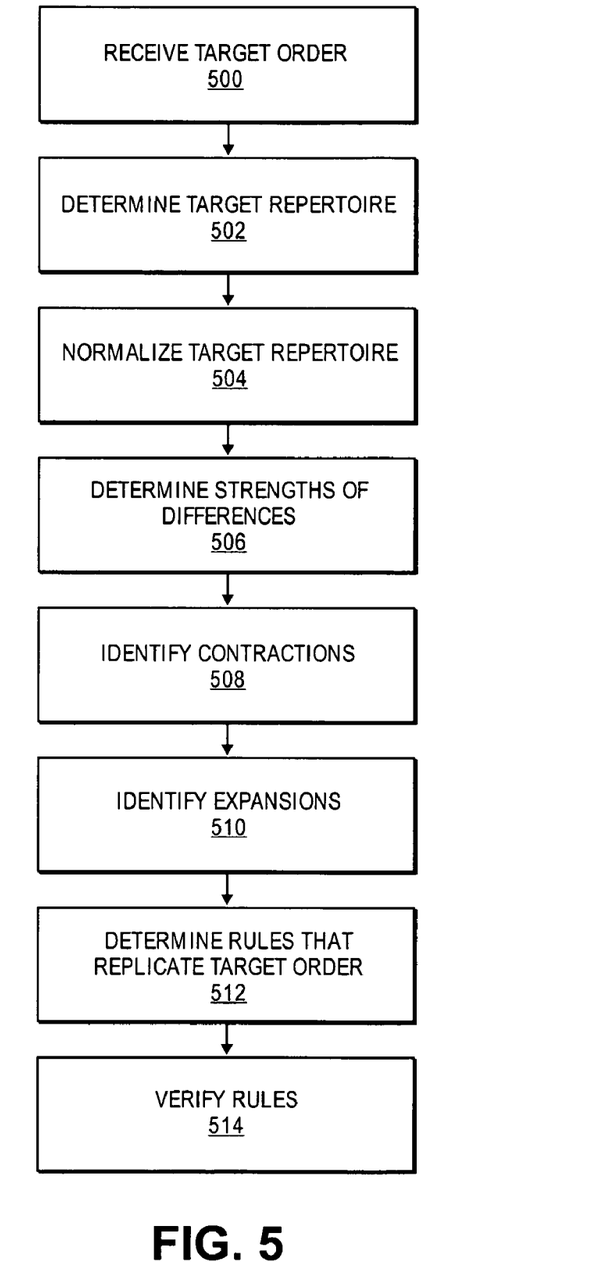
FIG. 5 illustrates a process flow that is consistent with embodiments of the present invention.

FIG. 5 illustrates an overall process flow for processing characters. For ease of discussion, FIG. 5 is discussed in relation to those embodiments of the present invention that are based on the UCA. Based on this exemplary discussion, one skilled in the art will then recognize how the principles of the present invention may be applied to other types of collation algorithms, such as those involving ISO standards.

In general, computer system 100 can receive target order 118 from language source 116. Sequences of characters in target order 118 may be tested to determine strength levels of difference between characters and character strings used by the given language. The data in target order 118 may also be recursively probed with other sequences to test for contractions and identify expansions. Sequences in target order 118 can then be compared against a known or predetermined sequence to generate a set of sorting rules into rules 210 that is specific to the language and application. A general process flow will now be described with reference to FIG. 5.

In phase 500, computer system 100 can receive target order 118 from language source 116. As noted, target order 118 can be received in a variety of forms, such as written text, data interpreted from written text, or data from a computer system. In some embodiments, computer system 100 will operate on target order 118 by assuming that its data is transitive, i.e., if a<b and b<c, then a<c. Processing then flows to phase 502.

In phase 502, computer system 100 may determine a group or "target repertoire" in target order 118. For example, collation engine 204 may focus on characters in target order 118 that are considered important for alphabetic ordering of a particular language, such as script characters and combining marks. In some embodiments, collation engine 204 determines a target repertoire to include characters, such as ASCII characters, non-spacing marks, contractions from an ICU collation for the locale of target order 118, exemplar characters for the locale of target order 118, characters of the script for the locale of target order 118, other characters in the blocks for those scripts, e.g., when including Arabic script characters the punctuation in that block. Processing then flows to phase 504.

In phase 504, computer system 100 may normalize the data in target order 118. For example, collation engine 204 may normalize the data in target order 118 according to known normalization forms of the UCA, such as Normalization Form C ("NFC") or Normalization Form D ("NFD"). Unicode normalization forms NFC and NFD may also be used in other parts of the process illustrated in FIG. 5.

In some embodiments, collation engine 204 may determine the UCA code point for each of the characters in the target repertoire and then apply a normalization form, such as NFD. For example, if target order 118 included {a, b, ä, dž}, collation engine 204 may transform this into {a, b, d, z, , }. In addition, in order to account for potential expansions or contractions, any items in target order 118 that were sequences in NFD form, will also be turned into strings in the target repertoire. Accordingly, in the example noted above, collation engine 204 would also add {a, dz} to the target repertoire.

In phase 506, collation engine 204 determines the strengths of differences between the characters in the target repertoire. In particular, collation engine 204 may begin by determining a base order of all the characters in the target repertoire, such as ... 1<2<3< ... <a<A ... <Z<z ... α<A< ... <ω<Ω .... From this base ordering, collation engine 204 can derive the set of completely ignorable characters, i.e., those characters that are equal to the empty string. Collation engine 204 may then remove the completely ignorable characters from the target repertoire to form what will be referred to as the "reduced repertoire." In addition, collation engine 204 may prune spurious items. For example, spurious equalities such as ",","=",", " (i.e., umlaut, cedilla=cedilla, umlaut) or s=ss/s may be removed by collation engine 204. Collation engine 204 can also remove any sequences that are canonical equivalents to those already in the target repertoire, such as x=xy/x.

For the reduced repertoire, collation engine 204 may then determine a set of probe strings. The set of probe strings are selected to detect and identify the strength of differences between the characters in the reduced repertoire. Examples of some probe strings are provided below. Of course, these are only examples and other characters or strings may be used as probe strings to suit various other languages or applications in target order 118.

In some embodiments, collation engine 204 may use a separator character ("SE"), such as "$", as one of the probing strings. Collation engine 204 may select the smallest non-ignorable character as the separator character. In addition, collation engine 204 may use a set of strength characters called B0, B1, B2, B3 to help identify the level of strength differences between characters. Furthermore, collation engine 204 may select an upper bound character called UB as one of its probing strings.

Some of the characteristics that collation engine 204 may use to select the probing strings will now be further discussed. As the label implies, SE can be used as a separator character to test the reduced repertoire. Accordingly, SE has a primary difference from the other characters in the reduced repertoire. In addition, SE can be a character that generally does not interact or contract with any character in the repertoire or UB. For example, symbols and numbers can be assumed to not enter into contractions or expansions with other characters, and thus, "$" is one example of a suitable SE character.

Collation engine 204 can use B0, B1, B2, B3 to test the strength level of difference between characters in the reduced repertoire. B0, B1, B2, B3 are generally non-primary ignorable characters. As to their relationship with each other, compared to B0, B1 is primary greater, B2 is secondary greater, and B3 is tertiary greater. For example, the characters {a, b, á, A} are one example of suitable characters for B0, B1, B2, B3. Alternatively, if uppercase is sorted first, then collation engine 204 may use {A, b, á, a} for B0, B1, B2, B3.

Collation engine 204 uses the UB probing string as a threshold to detect when characters interact with each other during collation, such as contractions and expansions. Collation engine 204 may select a UB that is primary greater than or equal to all characters in the reduced repertoire. In addition, in some embodiments, if collation engine 204 has selected a number for SE, then collation engine 204 may select a non-number for UB, in order to avoid affecting numeric sorting. In some embodiments, collation engine 204 selects characters in a script other than the reduced repertoire being tested for the UB probing string.

Collation engine 204 can then determine the strength of differences between characters in the reduced repertoire based on using the probing strings. For example, for any character string x and y in the reduced repertoire, collation engine 204 may use the following tests. Of note, for purposes of syntax "<" indicates a primary strength difference, "<<" indicates a secondary strength difference, and so on.

For equality: if x=y, then x=y.

For a primary strength difference: if x+SE+B1<y+SE+B0, then x<y. Alternatively, collation engine 204 may use the test: if B2+SE+x<B0+SE+y, then x<y.

For a secondary strength difference: if x+SE+B2<y+SE+B0, then x<<y. Alternatively, collation engine 204 may use the test: if B3+SE+x<B0+SE+y, then x<<y.

For a tertiary strength difference: if x+SE+B3<y+SE+B0, then x<<<y.

For anything else, x<<<<y. That is, x and y have a tertiary difference.

In some embodiments, these tests can be encapsulated into a software function or program code that tests pairs of characters in the base ordering. After testing pairs of characters according to the tests above, collation engine 204 may then determine the characters that are the upper bounds for various strength levels of difference. In some embodiments, collation engine 204 may therefore determine a set of characters UBn for each level of strength difference. These characters UBn may then be useful later in this process as described below.

For instances where x is the empty string (i.e., " "), collation engine 204 may instead probe for differences between x and y based on the following tests.

If B0<y and B0>y+B0, then y is a non-ignorable character.

If B2<=y+B0, B2>=y+B0, and language is French, then y is a primary ignorable character.

If B3<y+B0, then y is secondary ignorable.

If y< >"", then y is tertiary ignorable. Otherwise y is a completely ignorable character.

Furthermore, in some embodiments, it may be useful to detect when French secondaries are used in target order 118. The use of French secondaries may be considered important because it affects rules used to sort characters, especially primary ignorable characters. Collation engine 204 may use the following tests to determine whether French secondaries are being used. If B0+SE+B1<B1+SE+B0, then there are no French secondaries. However, if B1+SE+B0<B0+SE+B1, then target order 118 uses French secondaries. Processing then flows to phase 508.

In phase 508, collation engine 204 determines whether there are any contextual dependencies in the reduced repertoire of target order 118. Contextual dependencies may come in several forms including contractions, expansions, or some combination of both. A contraction is where a string of characters is sorted as if it were a shorter string. An example of a contraction is "ch" in Slovak. An expansion is where a string of characters is sorted as if it were a longer string. An example is ae, which expands to ae. Thus, ac<ad<ae<ae<af<ag. In some embodiments, collation engine 204 may first identify contextual dependent character strings in the reduced repertoire that act as contractions.

In addition, in some embodiments, collation engine 204 may assume that if a string is involved in a contextual dependency, then either the first two characters are also, or the last two characters are also. Furthermore, in phase 508, collation engine 204 may skip testing those characters that are primary ignorable.

Collation engine 204 may begin its evaluation for contractions with strings that include combinations of letters from that language's script, plus combining marks. However, if other information provided to collation engine 204, such as ideographs are never in contractions or expansions, then collation engine 204 may further limit or expand the strings it tests.

Collation engine 204 may determine contextual dependencies by taking all sets of three characters {x,y,z} from the reduced repertoire, and testing them for contextual dependency. However, in some embodiments, collation engine 204 may use the other algorithms to identify contractions.

For example, in one embodiment, collation engine 204 may start with the reduced repertoire and remove all ideograph characters to form a "contraction repertoire." Of note, collation engine 204 may also add back in precomposed characters, such as dz.

Collation engine 204 may begin by defining a starting repertoire ("SR") equal to the contraction repertoire ("CR") and a following repertoire ("FR") equal to CR. That is, SR=CR and FR=CR.

Collation engine 204 then tests for contractions starting with a character string, X, in SR using a two phased approach. In the first phase, collation engine 204 defines a second FR called FR' and sets FR'=FR. For each Y in FR, collation engine 204 then performs the following tests. If XY<X, then XY is a contraction. XY is added to the list of contractions ("CL") and XY is removed from FR'. In addition, if XY>XUB, then XY is a contraction. XY is added to the list of contractions and removed from FR'.

Next, for each Y in FR', collation engine 204 performs a sort to form, for example, a sequence A<B<... Z, where A, B, Z represent character strings and not literal characters. Collation engine 204 then combines each string in this sequence with the character string X, performs a sort, and forms a second sequence, XA<XB<XC<... XZ.

Collation engine 204 now compares these two sequences. If the corresponding elements are in the same order with the same strength then collation engine 204 exits this phase and proceeds to the second phase. However, if there are differences, then collation engine 204 identifies the minimal differences in the XY sequence, and adds each differing element XY to the list of contractions.

In the second phase of processing for contractions, collation engine 204 scans forward in each sequence above to where a difference was found. Collation engine 204 then notes last same value in each sequence. For purposes of explanation, these values will be referred to as S and XS.

Collation engine 204 advances through the sequences beyond S and XS and check each character string, N and XM respectively. If N and XM are the same, then the two sequences are synchronized and all contractions have been found. Collation engine 204 may then repeat processing again in the first phase to identify contractions at another strength level.

If XN or XM are in the list of contractions, then collation engine 204 skips these character strings and proceeds to the next strings in the sequences. If the comparison and strength of S versus M is the same as XS versus XM, then collation engine 204 adds XN to the list of contractions. Otherwise, collation engine 204 adds XM to the list of contractions and skips over X$M. Furthermore, in some embodiments, collation engine 204 will ignore sequences x and y, where combining class (x)<combining class (y). One skilled in the art will also recognize that collation engine 204 can be configured to compare pairs at a time.

If after doing these two phases for all characters in CR, and the list of contractions is not empty, then resets the SR and sets FR equal to the previous FR plus the list of contractions. That is, SR=old SR and FR=old FR+CL, in addition, SR=oldSR+CL and FR=old FR. Processing is repeated until the list of contractions is empty.

An example below is illustrated to assist in explaining the two phase process noted above. In this example, collation engine 204 is attempting to identify a Japanese contraction, which may be functionally expressed as &[before 3] a <<<a"/a, that is a"<<<aa. (Of note, for ease of explanation, this description substitutes Latin characters and punctuation instead of Japanese.) This relation should result in the ordering a"<<<aa. In addition, in this example, assume that a normal order of characters is #<<<"<<<^a<b<c. The contraction for a" will not be found by collation engine 204 in the first phase. However, in the second phase, collation engine 204 will obtain the following two sequences:

a$#<<<a$"<<<a$^<a$a<a$b<a$c a#<<<a^<a"<<<aa<ab<ac

In addition, during the second phase, collation engine 204 will identify those items in these sequences that cause a different order. In particular, collation engine 204 will identify a difference at a$" and a^ and the last same items were a$# and a#. Since a$^ and a^ have the same relative strength, collation engine 204 adds a" to the list of contractions, removes a" from the sequence and proceeds to the next items. Collation engine 204 then sees a$^ and a^, and determines that the two sequences are now synchronized. Processing may then flow to phase 510.

In phase 510, collation engine 204 may identify character strings that act as expansions during a sort. In order to detect the expansions, collation engine 204 will determine a certain character or string behaves as if it were a longer string. Collation engine 204 looks again at the restricted repertoire including the list of contractions. Collation engine 204 then sorts these strings to form a sequence, such as { . . . A<B<<<C<<D<<<E<F . . . }. Of note, the capital letters in this example are being used as symbols for purposes of explanation, not literal characters.

If a character "A" acts as an expansion during sorting, then it sorts as if it were character string "XY." Based on this principle, in some embodiments, collation engine 204 searches for character strings X, M, and N, such that XY' is not a contraction, and A<X, but A>XY'. The following example may serve to explain this concept.

In particular, the character "?" may expand to "question" in some languages or applications. Collation engine 204 may detect this expansion by searching for a non-ignorable character x such that q<"?"<qx. In some embodiments, collation engine 204 may iteratively use bounding characters UBn for x until q<"?"<qx.

For example, in some embodiments, collation engine 204 scan backwards from x to the last primary difference character sequence y. If x<y+UB0, then collation engine 204 can identify x as an expansion. Otherwise, collation engine 204 may again scan backwards from x to the last secondary difference character sequence y. If x<y+UB1, collation engine 204 can identify x is an expansion. Collation engine 204 may repeat this processing for each value of UBn. Alternatively, collation engine 204 may be configured to stop at a certain strength level. For example, collation engine 204 may be configured to stop at tertiary differences for an expansion (i.e., at UB2).

Once collation engine 204 knows that x<y+UBn, collation engine 204 can determine the exact character by scanning backward from UBn through characters of the same type, until a lesser strength character is found. In some embodiments, collation engine 204 can skip all characters that do not have the same level of difference as x.

For example, when scanning backward from UB1 for "?", collation engine 204 can test . . . z,y,x,w,v,u, skipping items that were not primary differences (U, V, . . . ). In this example, therefore, collation engine 204 finds that "qu"<"?". Continuing like this, collation engine 204 can find the maximum number of primary characters less than the candidate character, e.g., that "question"<"?". Of note, during this processing, collation engine 204 tests characters according to the target strengths used in target order 118, and not the predefined UCA strengths.

Proceeding to the secondary characters, collation engine 204 may iterate through various secondary characters until the last secondary difference is found. Collation engine 204 may back up a secondary character, if it causes the result to be secondary greater than the target, e.g., UB2. Collation engine 204 may then take the first character, and increment it through all secondary variants, proceed to the second character, and so on. For example, collation engine 204 may try "<acute>question", and so on. During these iterations, collation engine 204 skips any characters that are not secondary differences. Thus, for example, collation engine 204 could skip over Q, fullwidth Q, etc.

Collation engine 204 may then repeat these tests through lower strength level characters, such as tertiary characters. Eventually, collation engine 204 finds that "question" as the maximal string less than "?". Once collation engine 204 can add no more characters, collation engine 204 may test the strength of this expanded string using, and add "?/"uestion" to the list of expansions and base ordering. Collation engine 204 then repeats this processing to find other expansions and adds them to the base ordering.

In some embodiments, after collation engine 204 has added expansions to the base ordering, with the right strength, collation engine 204 can normalize each character sequence with NFC. Processing then flows to phase 512.

In phase 512, collation engine 204 determines a set of rules 210 that replicates the order found in target order 118. In some embodiments, collation engine 204 is configured to produce a set of minimal tailoring rules for the UCA that is in normalized form for comparison. In addition, in some embodiments, the tertiary ignorables are converted into Alternate Shifted form by collation engine 204, meaning that they will be between the primary ignorables and the non-ignorables, with alternate shifted turned on.

If target order 118 indicates uniformly uppercase strings are less than the lowercase equivalents, collation engine 204 may set case-first as part of rules 210. For example: . . . A<<<a<<Á<<<á<<Ä<<<ä<B . . . would become . . . a<<<A<<á<<<Á<<ä<<<Ä<b . . . . If collation engine 204 finds there are only case differences at level 3 and there are 4 levels, then collation engine 204 may also add a case level, and change level 4 differences to level 3 differences.

For those embodiments that are based on the UCA, the following example may assist in illustrating some of the rules that may be generated by collation engine 204. For example, the UCA default order may be . . . 9<a<<<A<<á<<<Á<<ä<<<Ä<b<<<B<c . . . . However, the order in target order 118 may be . . . 9<a<<<A<<á<<<Á<<ä<<<Ä<aa<Aa<<AA<<b<bb<B<c . . . .

In order to replicate the order found in target order 118, collation engine 204 may produce the following tailoring rules.

& Ä<aa<Aa<<AA
   & b<bb

Other formats for these rules are also consistent with the principles of the present invention.

In some embodiments, collation engine 204 may further modify rules 210 to increase processing efficiency. For example, collation engine 204 may change the reset string of one of rules 210 to minimize the amount of processing required. The following example may serve to illustrate this concept. The following rules produce exactly the same ordering, although they have different reset points.

&Ä<aa<Aa<<AA
   &A<aa<Aa<<AA
   &a<aa<Aa<<<AA In those embodiments that are based on the UCA, a<<Á in the UCA. In addition, an ICU rule for "<" inserts a new character at the first possible primary position, so it skips over any secondary and tertiary differences in the UCA. Accordingly, the following rules have the same effect in the UCA.

&a<<X
   &A<<X

Therefore, based on this feature of the UCA, collation engine 204 may scan backwards until it finds a reset point that differs from the previous one by at least a threshold requisite strength. This is the minimal reset point, which collation engine 204 may then use in rules 210. Therefore, collation engine 204 can change the first rule to &a<aa<Aa<<AA.

In some cases, target order 118 may cause collation engine 204 to insert characters into collation element table 208 with a stronger difference that what previously existed. In some embodiments, collation engine 204 may extend the sequences it uses in its rules in response to this condition. For example, if collation engine 204 produced a rule &b<bb. However, in those embodiments that are based on the UCA, collation engine 204 would insert the bb not immediately following the b, but later, as follows . . . . 9<a<<<A<<<á<<<Á<<<ä<<<Ä<aa<Aa<<AA<<b<<<B< bb<c . . . . In comparison, the desired order from target order 118 may be . . . 9<a<<< A<<<á<<<Á<<ä<<Ä<aa<Aa<<AA<<b<bb<B<c . . . .

Accordingly, in order to compensate, collation engine 204 may lengthen the sequence until a strength difference is reached that is at least that of the maximum difference in the inserted sequence. Thus, in this case, collation engine 204 would modify its rule to &b<bb<<<B.

Collation engine 204 may then normalize the format of its rules in rules 210 according to various syntax. Rules 210 may then be implemented or distributed to various other computer systems like system 100. Processing may then flow to stage 514.

In stage 514, collation engine 204 may verify rules 210. In particular, collation engine 204 sorts a given set of text and perform a test collation. This collation may then be compared to the ordering found in target order 118. In some embodiments, collation engine 204 may verify rules 210 by sorting the complete repertoire of strings in target order 118 plus all new contractions found and a bounding pair for each expansion found. Collation engine 204 may obtain a bounding pair by taking a rule, such as &z<x/y, and picking a character less than y(a) and greater than y(b), and adding "za" and "zb". In addition, collation engine 204 may also verify that the strength differences in its test collation are identical to those found in target order 118. Processing may then be considered complete.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for determining a set of rules for ordering text of a language, said method comprising:
   receiving information that indicates a target order of sets of characters in text of a language;
   determining strengths of differences between the characters based on the target order;
   identifying strings of characters that were sorted in the target order as a shorter string of characters;
   identifying strings of characters that were sorted in the target order as a longer string of characters; and
   determining, using a processor, a set of rules for ordering text of the language based on the strengths of differences between the characters, the identified strings of characters that were sorted in the target order as a shorter string, and the identified strings of characters that were sorted in the target order as a longer string,
   wherein the target order is a sequential ordering among the sets of characters in the text of the language.

2. The method of claim 1, wherein receiving the information that indicates the target order comprises receiving data from a processor.

3. The method of claim 1, wherein receiving the information that indicates the target order comprises interpreting information from a written text.

4. The method of claim 1, wherein receiving the information that indicates the target order comprises interpreting spoken information.

5. The method of claim 1, wherein determining the strengths of differences between characters comprises:
   selecting a repertoire of characters from the sets of characters in the information;
   determining a set of probing characters;
   testing the repertoire of characters based on the set of probing characters; and
   determining the strengths of differences between characters in the repertoire of characters based on the testing with the set of probing characters.

6. The method of claim 5, wherein determining the set of probing characters comprises determining at least one character that has a primary difference from the characters in the repertoire of characters and does not interact with the other characters in the repertoire of characters.

7. The method of claim 5, wherein determining the set of probing characters comprises determining at least one character that has a primary difference that is greater than or equal to all characters in the repertoire of characters.

8. The method of claim 5, wherein determining the set of probing characters comprises:
   selecting a first character;
   determining a second character that has a primary strength level difference from the first character; and
   determining a third character that has a secondary strength level difference from the first character.

9. The method of claim 1, wherein identifying the strings that sort as shorter strings of characters, comprises:
   selecting a candidate string of characters from the target order;
   combining the candidate string of characters with at least one other character in the information;
   determining if the combined string results in a change of sorting order; and
   adding the candidate string to a list based on whether the combined string results in a change of sorting order.

10. The method of claim 1, wherein identifying the strings that sort as shorter strings of characters, comprises:
    selecting a candidate string of characters from the target order;
    combining the candidate string of characters with at least one other character in the information to form a first combined string;
    combining the candidate string of characters with a character that has a primary difference that is greater than or equal to the other characters in the information to form a second combined string;
    comparing the first combined string with the second combined string result in a change of sorting order; and
    adding the candidate string of characters to a list based on whether the second combined string results in a change of sorting order.

11. The method of claim 1, wherein identifying the strings that sort as shorter strings of characters, comprises:
    determining a first sequence of sets of characters from the information;
    determining a second sequence of sets of characters based on respectively combining the sets of characters in the first sequence with a string of characters;
    identifying a difference in order between the first sequence and second sequence;
    identifying, at the location of the difference, the corresponding sets of characters in the first and second sequences;

determining a respective strength of differences between the corresponding sets of characters; and adding at least one of corresponding sets of characters to a list based on their respective strength of differences.

12. The method of claim 1, wherein identifying the strings of characters that sort as longer strings of characters comprises:

scanning through the target order to identify a last difference between a first character and a second character;

determining where the first character sorts in relation the second character in combination with another character; and identifying the first character as a string of characters that sort as a longer string of characters based on where the first character sorted.

13. The method of claim 1, wherein determining the set of rules comprises:

determining a second order of sets of characters based on a predetermined set of rules;

identifying differences between the second order and the target order; and determining the set of rules based on the identified differences.

14. The method of claim 13, wherein determining the second order of sets of characters based on the predetermined set of rules comprises determining the second order of sets of characters based on rules from a Unicode collation algorithm or equivalent.

15. The method of claim 13, wherein determining the second order of sets of characters based on the predetermined set of rules comprises determining the second order of sets of characters based on rules from an international components for Unicode implementation.

16. The method of claim 1, wherein the received information that indicates a target order is text of a language source which is sorted according to a set of rules for that language source.

17. A method for determining a set of rules for ordering text of a language, the method comprising:

receiving a target order for the language, the target order including sequences of characters ordered according to rules for ordering the language;

determining strengths of differences between the characters in the target order;

identifying contractions in the target order, the contractions being strings of characters sorted in the target order as a shorter string of characters;

identifying expansions in the target order, the expansions being strings of characters sorted in the target order as a longer string of characters; and determining, using a processor, the set of rules for ordering text of the language, the set of rules for ordering text of the language replicating the target order, the set of rules for ordering text of the language being determined based on the strengths of differences between the characters, the contractions and the expansions, wherein the target order is a sequential ordering among the sequences of the characters ordered according to rules for ordering the language.

18. The method of claim 17, wherein the strengths of differences between the characters include level one strength difference, level two strength difference and level three strength difference.

19. The method of claim 17, wherein the target order for the language is received at a user interface or retrieved from a storage medium, wherein a processor, coupled to the user interface and the storage medium, determines the strengths of differences between the characters in the target order, identifies the contractions and the expansions in the target order and determines the set of rules for ordering the text of the language, and wherein the set of rules are displayed to a user on a display, coupled to the processor, or stored in the storage medium.

20. An apparatus for determining a set of rules for ordering text of a language, said apparatus comprising:

means for receiving information that indicates a target order of sets of characters in text of a language;

means for determining strengths of differences between the characters based on the target order;

means for identifying strings of characters that were sorted in the target order as a shorter string of characters;

means for identifying strings of characters that were sorted in the target order as a longer string of characters; and means for determining a set of rules for ordering text of the language based on the strengths of differences between the characters, the identified strings of characters that were sorted in the target order as a shorter string, and the identified strings of characters that were sorted in the target order as a longer string, wherein the target order is a sequential ordering among the sets of characters in the text of the language.

21. The apparatus of claim 20, wherein the received information that indicates a target order is text of a language source which is sorted according to a set of rules for that language source.

22. A system that is configured to determine a set of rules for ordering text of a language, said system comprising:

an interface configured to receive information that indicates a target order of sets of characters in text of a language; and a processor configured by program code to determine strengths of differences between the characters based on the target order, identify strings of characters that were sorted in the target order as a shorter string of characters, identify strings of characters that were sorted in the target order as a longer string of characters, determine a set of rules for ordering text of the language based on the strengths of differences between the characters, the identified strings of characters that were sorted in the target order as a shorter string, and the identified strings of characters that were sorted in the target order as a longer string, wherein the target order is a sequential ordering among the sets of characters in the text of the language.

23. The system of claim 22, wherein the processor determines the strengths of differences between characters based on program code for selecting a group of characters from the sets of characters in the information, program code for determining a set of probing characters, program code for testing the group of characters based on the set of probing characters, and program code for determining the strengths of differences between characters in the group of characters based on the testing with the set of probing characters.

24. The system of claim 22, wherein the processor determines the set of probing characters based on program code for determining at least one character that has a primary difference from the characters in the group of characters and does not interact with the other characters in the group of characters.

25. The system of claim 22, wherein the processor determines the set of probing characters based on program code for determining at least one character that has a primary difference that is greater than or equal to all characters in the group of characters.

26. The system of claim 22, wherein the processor determines the set of probing characters based on program code for selecting a first character, program code for determining a second character that has a primary strength level difference from the first character, program code for determining a third character that has a secondary strength level difference from the first character.

27. The system of claim 22, wherein the processor identifies the strings that sort as shorter strings of characters based on program code for selecting a candidate string of characters from the target order, program code combining the candidate string of characters with at least one other character in the information, program code for determining if the combined string results in a change of sorting order, and program code for adding the candidate string to a list based on whether the combined string results in a change of sorting order.

28. The system of claim 22, wherein the processor identifies the strings that sort as shorter strings of characters based on program code for selecting a candidate string of characters from the target order, program code for combining the candidate string of characters with at least one other character in the information to form a first combined string, program code for combining the candidate string of characters with a character that has a primary difference that is greater than or equal to the other characters in the information to form a second combined string, program code for comparing the first combined string with the second combined string result in a change of sorting order, and program code for adding the candidate string of characters to a list based on whether the second combined string results in a change of sorting order.

29. The system of claim 22, wherein the processor identifies the strings that sort as shorter strings of characters based on program code for determining a first sequence of sets of characters from the information, program code for determining a second sequence of sets of characters based on respectively combining the sets of characters in the first sequence with a string of characters, program code for identifying a difference in order between the first sequence and second sequence, program code for identifying, at the location of the difference, the corresponding sets of characters in the first and second sequences, program code for determining a respective strength of differences between the corresponding sets of characters, and program code for adding at least one of corresponding sets of characters to a list based on their respective strength of differences.

30. The system of claim 22, wherein the processor identifies the strings of characters that sort as longer strings of characters based on program code for scanning through the target order to identify a last difference between a first character and a second character, program code for determining where the first character sorts in relation the second character in combination with another character, program code for identifying the first character as a string of characters that sort as a longer string of characters based on where the first character sorted.

31. The system of claim 22, wherein the processor determines the set of rules based on program code for determining a second order of sets of characters based on a predetermined set of rules, program code for identifying differences between the second order and the target order, and program code for determining the set of rules based on the identified differences.

* * * * *